United States Patent [19]

Sakai et al.

[11] Patent Number: 4,617,806
[45] Date of Patent: Oct. 21, 1986

[54] LIQUID LEVEL CONTROL APPARATUS

[75] Inventors: Tadashi Sakai; Nobutaka Naruse, both of Toyoake, Japan

[73] Assignee: Hoshizaki Electric Co., Ltd., Toyoake, Japan

[21] Appl. No.: 769,332

[22] Filed: Aug. 26, 1985

[30] Foreign Application Priority Data

Sep. 5, 1984 [JP] Japan ................. 59-184517
Sep. 5, 1984 [JP] Japan ................. 59-184518
Jun. 20, 1985 [JP] Japan ................. 60-132932

[51] Int. Cl.⁴ .................. F25C 1/12; F16K 31/18
[52] U.S. Cl. .......................... 62/347; 73/308; 73/313; 137/430; 137/453; 200/84 C; 340/624
[58] Field of Search ............. 73/305, 306, 308, 313, 73/299; 137/386, 392, 428, 430, 431, 433, 453, 454; 200/84 C; 340/624; 62/347

[56] References Cited

U.S. PATENT DOCUMENTS

| | | | |
|---|---|---|---|
| 759,131 | 5/1904 | Rowinsky | 137/428 |
| 1,227,539 | 5/1917 | Illsley | 137/433 |
| 1,343,867 | 6/1920 | Grove | 137/431 |
| 1,705,845 | 3/1929 | Woodman | 137/453 |
| 2,979,161 | 4/1961 | Lyden | 137/453 |
| 3,163,731 | 12/1964 | Lyden | 200/84 C |
| 3,751,614 | 8/1973 | Jones | 200/84 C |
| 4,020,481 | 4/1977 | Nakagawa | 200/84 C |
| 4,047,655 | 9/1977 | McCafferty | 137/453 |
| 4,081,639 | 3/1978 | Tice | 200/84 C |
| 4,180,085 | 12/1979 | Berges et al. | 137/429 |
| 4,345,879 | 8/1982 | Steiner | 200/84 C |
| 4,412,429 | 11/1983 | Kohl | 62/347 |
| 4,526,014 | 7/1985 | Suyama et al. | 62/347 |

*Primary Examiner*—George L. Walton
*Attorney, Agent, or Firm*—Wenderoth, Lind & Ponack

[57] ABSTRACT

A liquid level control apparatus which detects a liquid level in a tank employed, for example, in ice making equipment, to thereby trigger a control operation. The level control apparatus comprises a tank containing a body of liquid, a float movable in response to the vertical movement of the surface of liquid within the tank, a hollow case having a closed top and an open bottom, and a guide member disposed within the case for guiding the vertical movement of the float. The hollow case is arranged so that the open bottom thereof is closed by the rising liquid to thereby from a hermetically closed chamber within the case. An upstanding tubular member extends into the hollow case such that the lower end of the tube defines a level of liquid at which the hermetically closed chamber is formed. The chamber thus formed is effective for preventing the guide member from being immersed in the liquid to assure smooth movement of the float.

6 Claims, 15 Drawing Figures

LIQUID LEVEL CONTROL APPARATUS

BACKGROUND OF THE INVENTION

The present invention relates to a liquid level control apparatus for controlling or detecting the liquid level in a water tank employed, for example, in an ice making machine.

Figure 1:
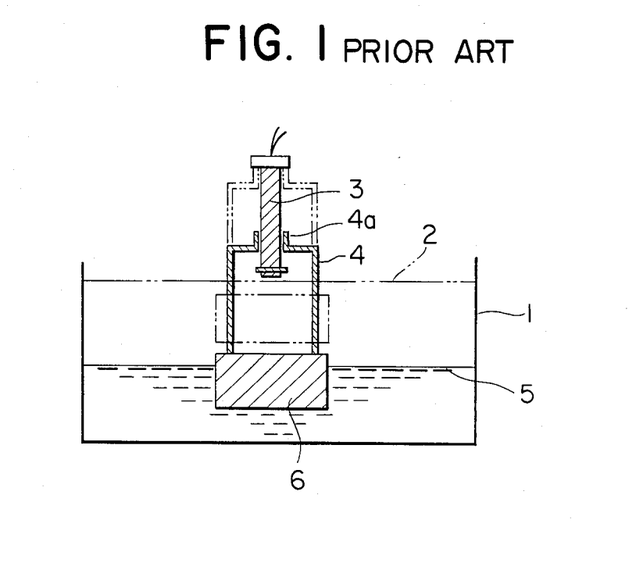
FIG. 1 is a schematic sectional view illustrating a well known structure of a liquid level control apparatus in the prior art.

FIG. 1 of the accompanying drawings shows schematically a structure of a well known liquid level control apparatus, by way of example. In the drawings, a reference numeral 1 denotes a container or tank which is provided with a guide member 3 disposed above the maximum height which the liquid level 2 within the tank 1 can attain. The guide member 3 supports a vertically slidable leg member 4. A slidable sleeve 4a is integrally formed at a base end portion of the leg member 4.

Mounted on the leg member 4 at the lowermost free end thereof is a float 6 which is vertically movable in response to variations or changes in the liquid level between the maximum level 2 and a controlled liquid level 5.

In the well known liquid control apparatuses, the guide member or column 3 is disposed above the maximum height so that the liquid level can attain, as mentioned above, a view to preventing the guide column 3 from being immersed within the body of liquid when the liquid level rises up to the maximum height 2, because otherwise high viscosity of liquid, contaminants or the like would be deposited on the slidably contacting surfaces of the guide column 3 and the slidable sleeve 4a, causing erroneous level detection and hence erroneous operation or mulfunction. Even so, well known liquid level cotrol apparatuses suffer the drawbacks mentioned below:

(1) When the difference between the maximum level 2 and the controlled liquid level 5 is selected to be large, the length of the float supporting leg member 4 has to be increased. Additionally, the leg member 4 has to be imparted with adequate rigidity for assuring a smooth relative movement of the leg member 4 along the guide column notwithstanding the bouyancy exerted on the float 6. This provides an additional factor contributing to an increase in weight of the leg member 4.

(2) In order that the arm 4 can move up and down smoothly in response to the bouyancy exerted on the float 6 according to the change in the liquid level, it is necessary to provide sufficient clearance between the slidable sleeve 4a and the guide column 3. However, due to such clearance, the leg member 4 tends to be inclined at large angles relative to the longitudinal axis of the guide member 3, making it difficult or even impossible to control or monitor the liquid level with acceptable accuracy.

In the above noted construction, the well known liquid control apparatuses can respond to changes in the height of liquid surface only after a delay and difficulty is encountered in performing detection or control of the liquid level with high accuracy, giving rise to problems.

SUMMARY OF THE INVENTION

It is therefore an object of the present invention to provide a liquid level control apparatus in which the shortcomings of the prior art apparatus are alleviated or eliminated.

In view of the above and other objects which will become more apparent as the description proceeds, one aspect of the invention is to provide a hollow case having a closed top and an open bottom which is provided in association with a liquid tank for accommodating a float which moves in response to vertical movement or displacement of a liquid surface. This case may be disposed inside or outside of the tank in such a manner that upon a rise in the liquid level, the open bottom of the case is hermetically closed by the liquid so as to define a hermetically closed chamber within the case. The case is provided with guide means for guiding the vertical movements of the float. When the hermetically closed space or chamber is formed within the case, the float is caused to move upward or downward as guided by the guide means in response to the changes in the liquid level which hermetically closes the open bottom of the case.

On the other hand, in case the liquid level within the tank is too low to form the hermetically closed space or chamber within the case, movement of the float can follow instantaneously the change in the liquid level within the tank. When the hermetically closed chamber is formed upon contacting of the liquid with the bottom end face of the case due to rising of the liquid surface, the float is subsequently caused to move upwards in accordance with the liquid level within the case. Since the rising of the liquid level within the case is held to an extremely low rate when compared with the liquid level outside of the case due to the pressure prevailing within the hermetically closed chamber, the result is that displacement of the float within the case is held to a smaller value compared with the magnitude of change in the liquid level within the tank.

The above and other features and advantages of the present invention will be more apparent upon consideration of the following description of the preferred embodiments taken in conjunction with the accompanying drawings.

DESCRIPTION OF THE PREFERRED EMBODIMENTS

Figure 2:
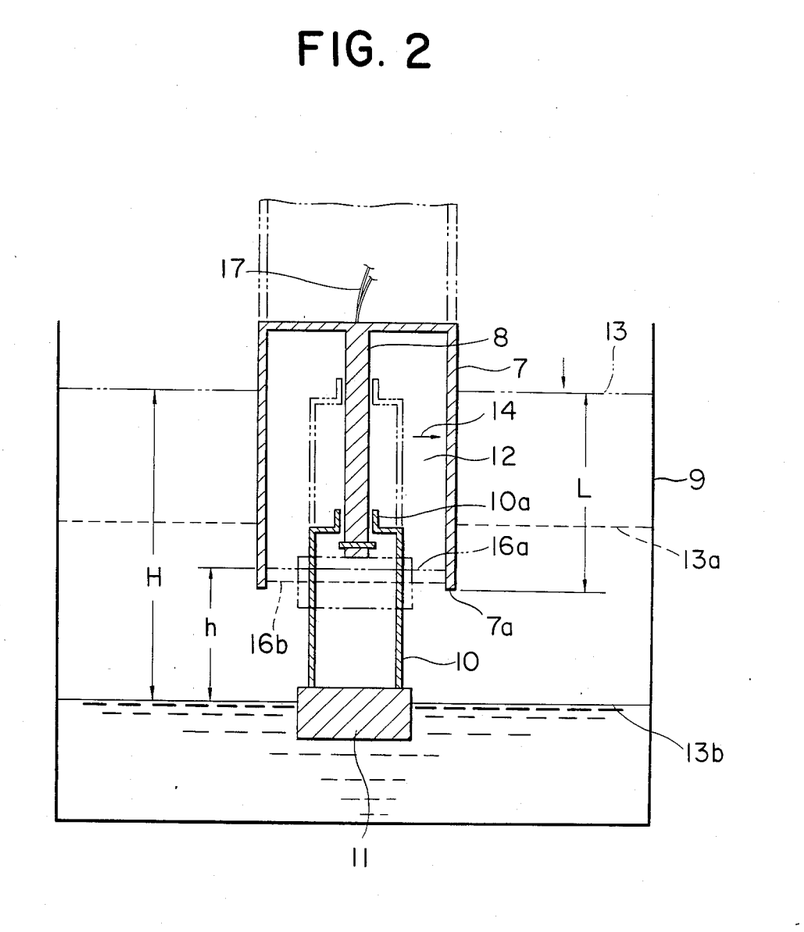
FIG. 2 is a sectional view showing the structure of a liquid control apparatus according to a first exemplary embodiment of the invention.

Referring now to the description of a liquid level control apparatus according to a first embodiment of the invention by referring to FIGS. 2 to 5. Referring to FIG. 2 which shows a liquid level control apparatus in a sectional view, a hollow case 7 having an open bottom and a closed top wall is disposed within a container or tank 9 and has a guide member 8 depending from the closed top wall vertically toward the liquid surface. A leg member 10 is slidably mounted on the guide member 8 through a slidable sleeve 10a formed in the leg member 10 so as to be moved vertically relative to the case 7. Fixedly mounted on the lower end of the leg member 10 is a float 11 which is caused to move up and down in response to the displacement of the surface of the liquid within the tank 9.

The case 7 is mounted in the tank 9 in such a manner that upon rising of the surface of the liquid within the tank 9, the open bottom of the case 7 is hermetically closed by the liquid so as to form a hermetically closed space or chamber (hereinafter referred to also as the sealed chamber) 12 within the case 7. The volume of the sealed chamber 12 is reduced to a minimum when the liquid surface attains the maximum level 13 within the tank 9 and can be arithmetically determined on the basis of the pressure prevailing on the liquid surface within the tank 9, the pressure 14 within the case 7, the specific gravity of the liquid, the length or distance L between the maximum height or level 13 attainable by the liquid surface and the lower end face 7a of the case 7, the inner volume of the case 7 and other factors. It should be noted that the guide member 8 is disposed within the case 7 such that the lower end portion thereof is located above the maximum liquid level 16a which may take place within the case 7 (this level is also referred to as the intra-case maximum liquid level), even when the liquid within the tank 9 has attained the maximum liquid level 13 (also referred to as the intra-tank maximum liquid level), whereby the lower end portion of the guide member 8 is prevented from being immersed in the liquid.

With the structure of the liquid level control apparatus described above, when the intra-tank controlled liquid level 13a (as shown by a broken line) within the tank is higher than the height of the lower face 7a of the case 7, the height of the intra-case controlled liquid level 16b can be readily determined arithmetically on the basis of the factors or dimensions mentioned above. At that time, the float 11 lies at the intra-case controlled liquid level 16b which is lower than the intra-tank controlled liquid level 13a. On the other hand, when the intra-tank controlled liquid level 13b (as shown by a solid line) is lower than the lower end face 7a of the case 7, the height position of the float 11 corresponds to the intra-tank controlled liquid level 13b. In this manner the displacement h of the float 11 can be significantly reduced when compared with the level difference H between the intra-tank maximum liquid level 13 and the intra-tank controlled liquid level 13b, when the lower end face 7a is located above the intra-tank controlled liquid level 13b. This means that the length of the guide member 8 and the float suspending leg member 10 can be correspondingly decreased, to an advantage. Further, even when the level difference H between the intra-tank controlled liquid level 13b and the intra-tank maximum liquid level 13 is to be increased more than that of the illustrated embodiment, the necessity of increasing the length of the leg member 10 can be avoided by elongating the case 7 and the guide member 8 to thereby increase the internal volume of the sealed chamber 12 or by providing a riser portion of the case 7 so that lead wire 17 is protected from being immersed within the liquid.

Figure 2A:
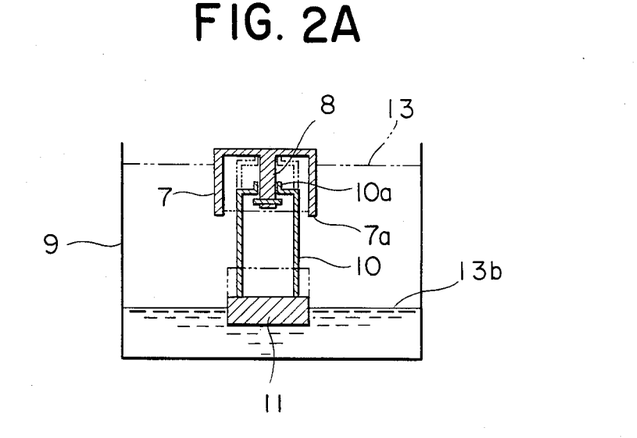
FIG. 2A is a sectional view showing a modification of the structure shown in FIG. 2.

It should be mentioned that in case detection of the liquid level is not required, the case 7 may be implemented in a shorter axial length so that the slidable sleeve 10a of the float suspending leg member 10 may abut the lower surface of the top wall of the case 7 before the liquid surface within the tank 9 has attained the lower end face 7a of the case 7, as is illustrated in FIG. 2A. According to the above construction, the immersion of the guide member 8 in the liquid can be avoided even when the float 11 is totally immersed in the liquid.

Figure 3:
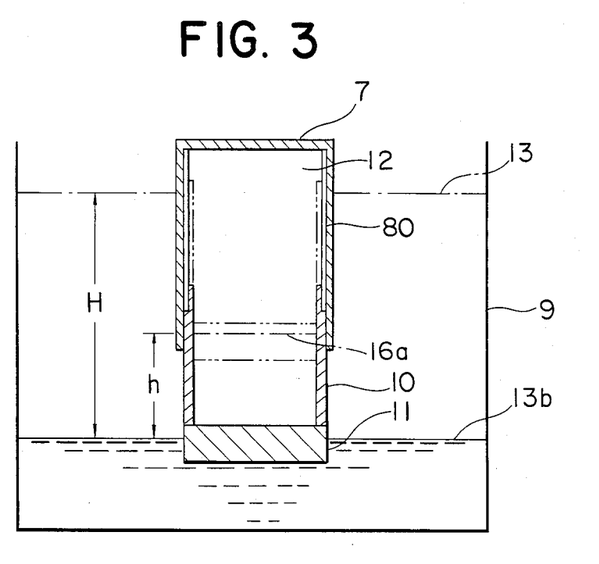
FIG. 3 is a sectional view showing another structure of the liquid level control apparatus according to the first embodiment of the invention.
Figure 4:
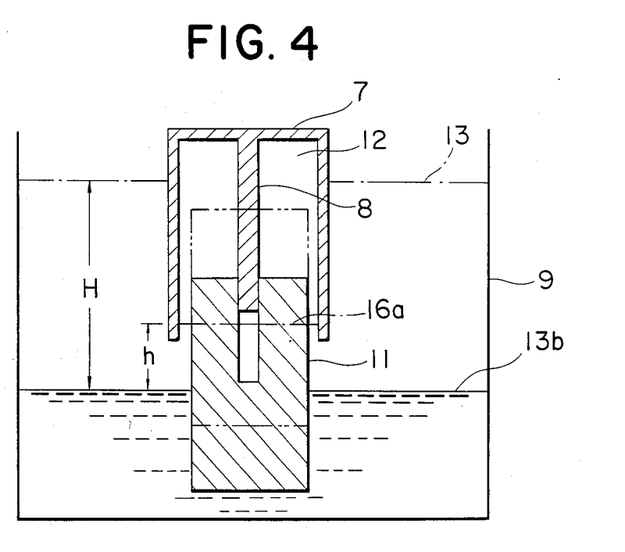
FIG. 4 is a sectional view showing still another structure of the liquid level control apparatus according to the first embodiment of the invention.

FIGS. 3 and 4 show versions of the liquid level control apparatus according to the first embodiment of the invention. In these figures, the same or equivalent parts as those shown in FIG. 2 are denoted by like reference numerals, and repeated description of these parts is omitted. Referring to FIG. 3, there are formed in the inner peripheral wall of the case 7, a plurality of guide grooves 80 extending in the vertical direction. These guide grooves 80 serve substantially the same function as the column-like guide member 8 shown in FIG. 2. More specifically, the guide grooves 80 serve for guiding the leg member 10 supporting the float 11 which is moved in the vertical direction in response to changes in the level of liquid within the tank 9 and the case 7. It should be noted the guide grooves 80 are located above the intra-case maximum liquid level 16a so that they are not immersed in the body of liquid even when the liquid level within the tank has attained the intra-tank maximum of highest level 13.

Referring to FIG. 4, the guide column 8 depends from the top wall of the case 7, as in the case of the apparatus shown in FIG. 2. The float 11 is, however, mounted to be vertically slidable on the guide column 8. It will further be seen that the leg member 10 shown in FIG. 2 has been eliminated, because the float 11 is guided directly by the guide column 8. With this arrangement, there is no worry about delay in response and accompanying erroneous operation due to possible unsmooth movement of a leg member 10. Further, since the bottom of the guide member 8 is constantly enclosed by the float 11, the former can be positively protected from contamination.

In the liquid control apparatus described so far, the hermetically closed chamber 12 is filled with air. However, the invention is not restricted thereto. The closed chamber 12 may be filled with nitrogen gas, carbon dioxide gas or the like in consideration of the kind of gas present above the liquid surface within the tank 9.

Figure 5:
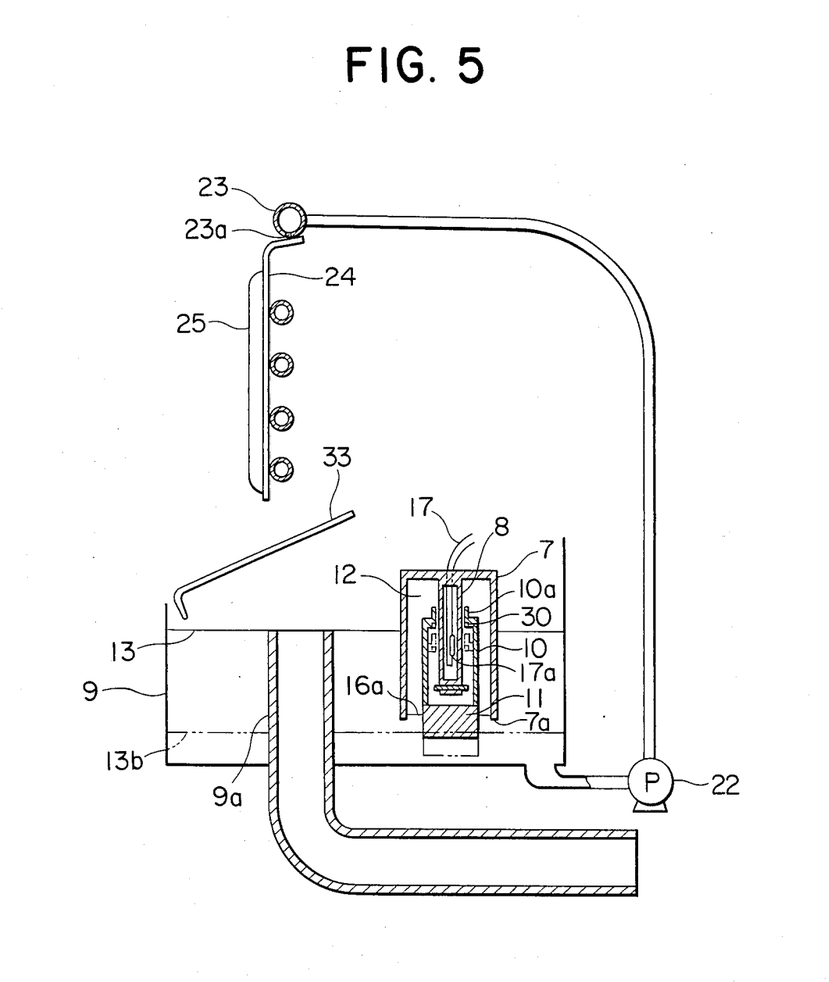
FIG. 5 is a sectional view showing a structure of an ice making or manufacturing machine to which the liquid level control apparatus according to the first embodiment of the invention is applied for controlling or monitoring the liquid level in a water tank.

FIG. 5 shows the structure of an ice making apparatus in which the liquid control apparatus shown in FIG. 2 is made use of for detecting completion of ice making. The intra-tank maximum liquid level 13 within a water tank 9 for storing water to be transformed into ice is attained through supply of water for a predetermined time duration. Water supplied in excess is discharged to the outside through an overflow pipe 9a. Water within the water tank 9 is fed to a water sprinkling pipe 23 by means of a pump 22 and sprinkled through orifices 23a to flow down along and over the surface of a refrigerating plate 24 to be thereby returned to the water tank 9.

In this manner, as water is circulated between the water tank 9 and the refrigerating plate 24, the water is progressively cooled on the refrigerating plate 24, to progressively lower the temperature of the circulated water, whereby freezing begins to take place on the refrigerating plate 24. As a consequence, the water level within the water tank 9 is correspondingly lowered.

In an ice making machine of the structure described above which is provided with the liquid level control apparatus shown in FIG. 2, even when the water level within the water tank 9 has attained the intra-tank maximum level 13, the maximum liquid level within the case 7 of the liquid level control apparatus is prevented from rising much past the lower end face 7a of the case 7 by the air pressure within the case 7. As a consequence, neither the guide member 8 nor the slidable sleeve 10a of the leg member 10 mounted slidably on the guide column 8 is immersed within water even when the water level within the water tank 9 has attained the intra-tank maximum level 13.

Disposed within the guide member 8 is a reed switch 17a which is connected to lead wires 17 and which cooperates with a magnet 30 mounted on a slidable sleeve 10a. When the magnet 30 approaches the reed switch 17a, the latter is closed to produce an electrical signal representative of the liquid level within the water tank 9.

Further, the operation of the liquid level control apparatus employed in the ice making or manufacturing machine will be described. As a block of ice grows, the water level within the water tank 9 is lowered, in which case, the float 11 is also lowered in response to the various factors described hereinbefore, so long as the water level within the tank 9 is above the lower end face 7a of the case 7. However, from the point in time when the water level within the tank 9 drops below the lower end face 7a of the case 7, the downward movement of the float 11 instantaneously follows the lowering of the water level within the water tank 9 without being influenced by the factors described hereinbefore.

When an ice block of a desired size is formed, i.e. when the float 11 is lowered to said control liquid level 13b, the magnet 30 of the slidable sleeve 10a traverses the reed switch 17a, producing a signal indicative of completion or termination of the ice making cycle. Subsequently, the cycle for removing the ice block 25 from the refrigerating plate 24 is initiated and water supply to the water tank 9 is started simultaneously. The ice block 25 dropping from the refrigerating plate 24 is prevented from falling within the water tank 9 by an interposed baffle or guide plate 33.

Upon completion of the water supply to the water tank 9 after the dropping of the ice block from the refrigerating plate 24, the ice making process described hereinbefore is again started, wherein upon lowering of the float 11 to the controlled liquid level which is detected by the reed/magnet switch device, the operation of the liquid control apparatus described above is triggered again.

Figure 6:
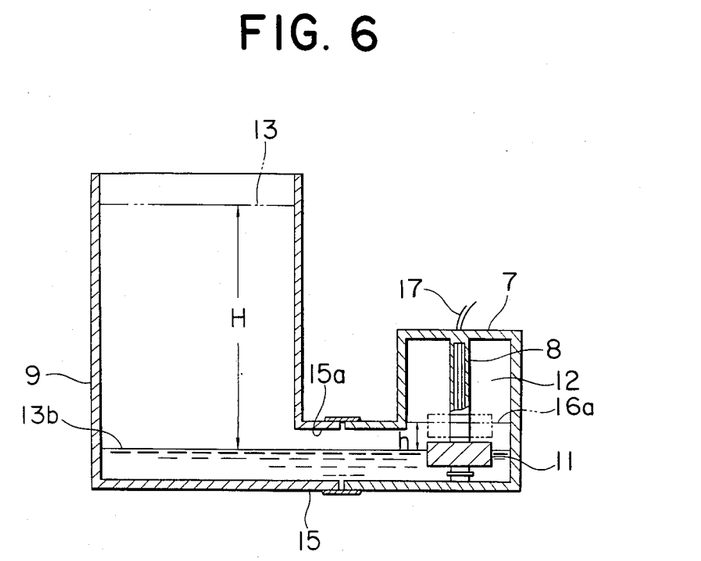
FIG. 6 is a schematic sectional view showing a structure of the liquid level control apparatus according to a second embodiment of the present invention.

Further, the liquid level control apparatus according to a second embodiment of the invention will be described by referring to FIGS. 6 to 8. FIG. 6 is a schematic sectional view showing the structure of the liquid control apparatus according to the second embodiment. Referring to the drawing, a tank 9 is communicated with a hollow case 7 by way of a connecting conduit 15. A guide member 8 depends downwardly from the top wall of the case 7 toward the liquid surface. A float 11 which moves in the vertical direction in response to change in the liquid level within the tank 9 is mounted to be axially slidable on the guide member 8. As will be seen in FIG. 6, a hermetically closed chamber 12 is formed within the case 7 when the liquid level within the tank 9 exceeds the level corresponding to the top of the connecting conduit 15. After the formation of the hermetically closed chamber 12, the height of the liquid level within the case 7 is determined by the various factors such as the pressure within the case 7, specific gravity of the liquid, distance between the liquid surface within the tank 9 and the top 15a of the connecting conduit 15, inner volume of the case 7 and others. Lead wires 17 of a reed switch (not shown) accommodated within the guide member 8 are led out through the top wall of the case 17.

With the structure of the liquid level control apparatus described above, the height position of the float 11 coincides with the liquid level within the tank 9 when the latter is lower than the level corresponding to the top 15a of the connecting conduit 15, because the case 7 is communicated with the tank 9. However, once the liquid level within the tank 9 exceeds the level corresponding to the top 15a of the connecting conduit 15, the height of the float 11 within the case 7 is determined by the various factors mentioned above. The range of height h between the controlled liquid level 13b and the maximum level 16a within the case 7 in which the float 11 can move vertically after the liquid level within the tank 9 has attained the top 15a of the conduit 15 corresponds substantially to the minimum inner diameter of the connecting conduit 15 plus a small value of height and is significantly reduced when compared with the distance H between the maximum liquid level 13 within the tank 9 and the controleld liquid level 13b.

When the controlled liquid level 13b is to be displaced from that of the illustrated embodiment, this can be accomplished by communicating the liquid control apparatus to the tank 9 at a position in the vicinity of the desired controlled liquid level. In other words, the liquid level control apparatus can be employed independent of the distance H between the maximum liquid level 13 and the controlled liquid level as well as of the capacity of the tank.

Since the liquid level control apparatus according to the illustrated embodiment is provided externally of the tank 9, the lead wires 17 can be led outwardly directly without passing through the tank 9. Thus, this liquid level control apparatus can be applied to equipment designed to process combustible liquid without danger of fire or explosion. Also, there is no possibility of erroneous operation caused by the reed switch becoming soaked from drops of liquid running down along the lead conductor, as in the case of the well known liquid level control apparatus.

Figure 7:
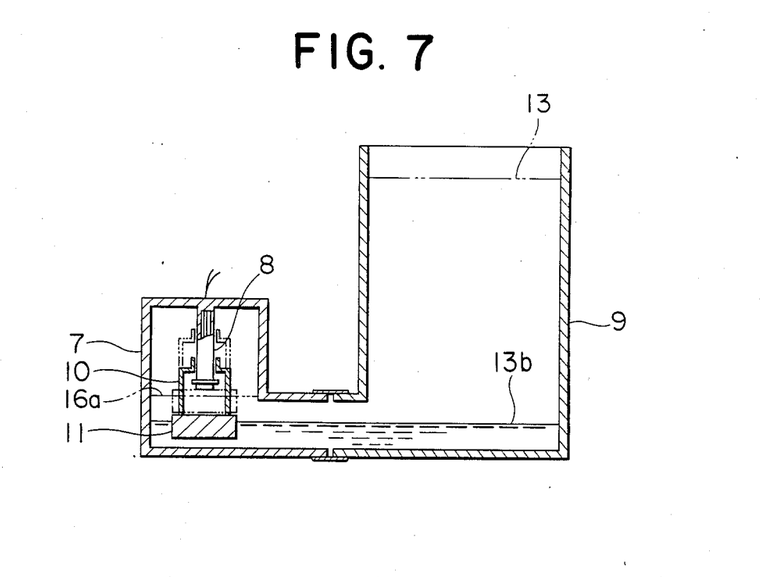
FIG. 7 is a sectional view showing another structure of the liquid level control apparatus according to the second embodiment of the invention.
Figure 8:
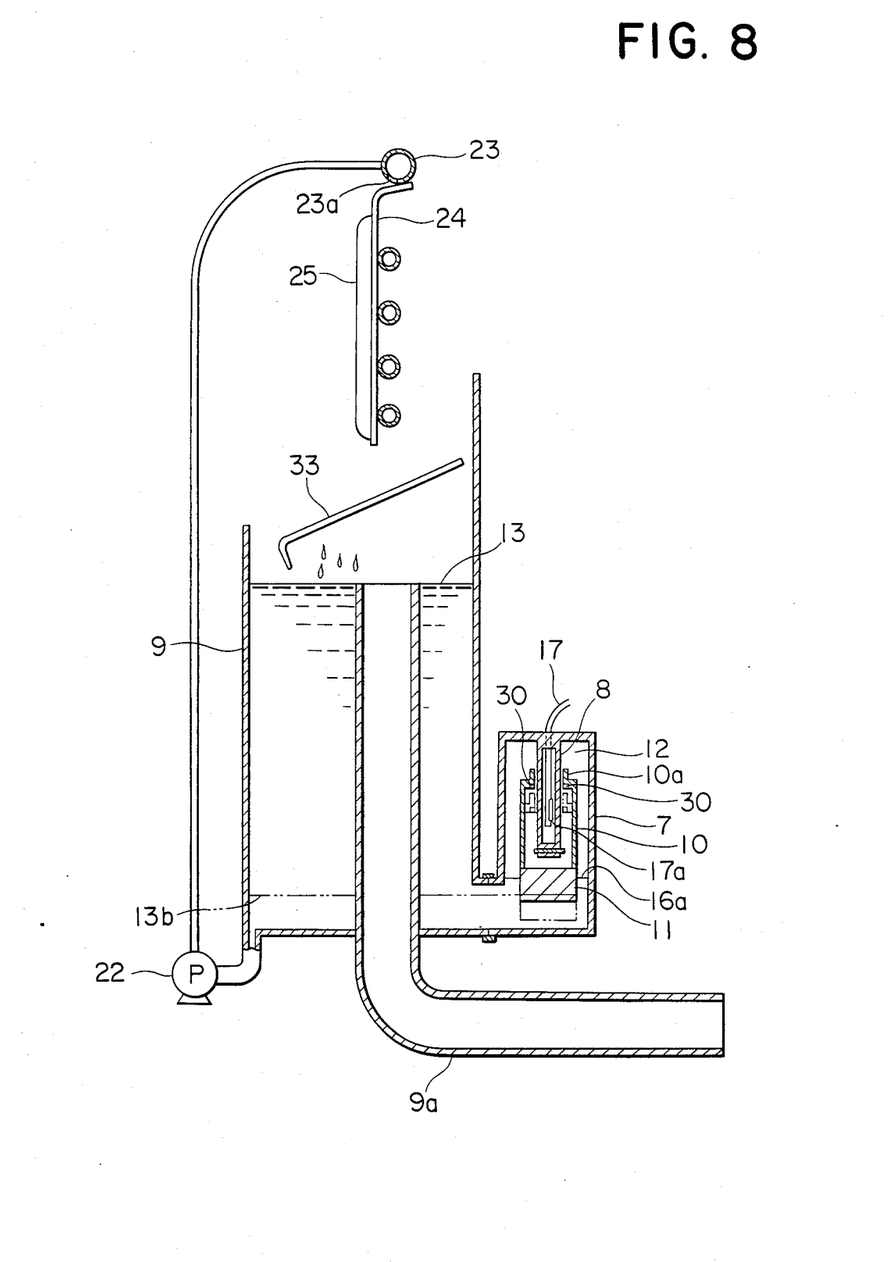
FIG. 8 is a sectional view showing a structure of an ice making machine to which the liquid level control apparatus according to the second embodiment of the invention is applied for controlling the liquid level in a water tank.

In case the liquid within the tank 9 is of high viscosity or there is a possibility of contaminants or impurities being deposited on the guide member 8, it is preferable to adopt a liquid level control apparatus having a structure as shown in FIG. 7 which is also implemented according to the second embodiment of the invention. Referring to the drawing, it will be seen that the length of the guide member 8 has been selected to be so short that it cannot be immersed within the liquid even when the liquid level within the case 7 has attained the intra-case maximum liquid level 16a, wherein the float 11 is guided by the guide member 8 by way of a suspending leg member 10.

An ice making apparatus to which the liquid level control apparatus according to the second embodiment of the invention is applied for detecting completion of an ice making cycle will now be described by accompanying FIG. 8. It is assumed that the ice making apparatus itself operates in a manner similar to the apparatus described hereinbefore in conjunction with FIG. 5. Namely, water within the water tank 9 is circulated through a flow path between the water tank 9 and the refrigerating plate 24 to be thereby progressively cooled down to a point at which freezing begins to take place on the refrigerating plate 24. In accompaniment, the water level within the tank 9 is progressively lowered. During the circulation of water, the liquid level control apparatus is completely protected from being soaked with water, because the control apparatus is located externally of the ice making apparatus.

Even when the water surface within the tank 9 is at the intra-tank maximum liquid level 13, the maximum liquid level 16a within the case 7 remains at a level lying in the vicinity of the lower end of the case 7 because of the pressure of air confined within the hermetically closed chamber 12. Consequently, the guide member 8 as well as the slidable sleeve-like portion 10a of the float suspending leg member 10 will never be immersed within water even when the water surface within the tank 9 has attained the maximum level 13. The operation of the liquid level control apparatus in other respects will be self-explanatory to those skilled in the art in view of the foregoing description. Accordingly, any further explanation will not be necessary.

Figure 9:
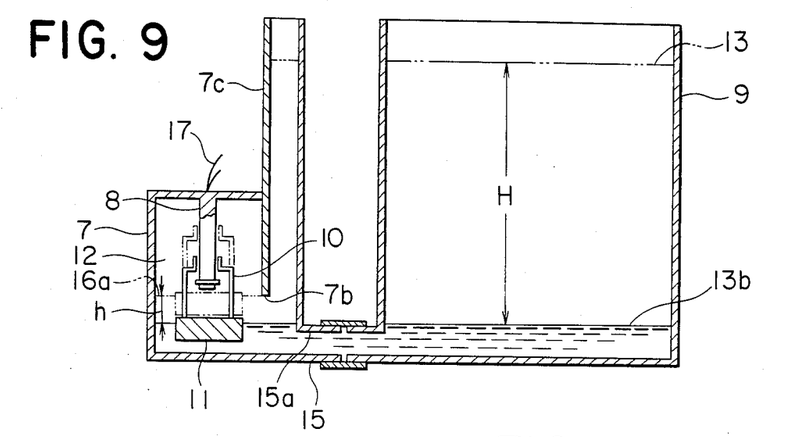
FIG. 9 is a sectional view showing a structure of a liquid level control apparatus according to a third embodiment of the invention.

Further, the liquid level control apparatus according to a third embodiment of the invention will be described by referring to FIG. 9 in which parts the same as or equivalent to those shown in FIG. 7 are denoted by like reference symbols and repeated description of these parts is omitted. A tank 9 communicating with the atmosphere through an open top is communicated with a case 7 having a tightly closed top by way of a connector or communicating conduit 15. An upstanding tubular hollow member 7c is provided in combination with the case 7. The tubular member 7c has a lower end 7b opened within the case 7 and a top end opened to the atmosphere. The case 7 is so disposed that a hermetically closed chamber 12 is formed therein upon rising of the water surface within the tank 9 in the same manner as described hereinbefore. However, in the case of this illustrative embodiment, the liquid level at which the hermetically closed chamber 12 is formed is determined by the position of the open lower end 7b of the tubular member 7c.

With such a structure of liquid level control apparatus, the interior of the case 7 is at the same pressure as the interior of the tank 9 when the liquid surface within the tank 9 remains at a level lower than the height of the open lower end 7b of the upstanding tubular member 7c, because of fluid communication between the case 7 and the tank 9 through the conductor 15. In other words, the liquid surface within the case 7 is at the same level as the liquid surface within the tank 9. Accordingly, the float 11 is floating at the same level as the liquid surface within the tank 9. However, once the liquid surface within the tank 9 exceeds the level corresponding to the open lower end 7b of the upstanding tubular member 7c, the liquid surface within the case 7 is kept from rising above a level slightly higher than the open lower end 7b notwithstanding the continuous rising of the liquid surface within the tank 9, because of pressure produced within the hermetically closed chamber 12 formed within the case 7. In contrast, the liquid level within the upstanding tubular member 7c coincides with that of the tank 9 because the top end of the former is freely opened into the atmosphere. The range h in which the float 11 is displaced between the controlled liquid level 13b and the maximum liquid level 16a attainable within the case 7 is primarily determined by the position of the open lower end 7b of the upstanding tubular member 7c and is remarkably small when compared with the distance H between the maximum liquid level 13 and the controlled liquid surface 13b within the tank 9.

In this manner, the maximum liquid level 16a attainable within the case 7 is determined primarily by the position of the open lower end of the upstanding tubular member 7c regardless of the position of the top 15a of the communicating conduit 15. Accordingly, when the controlled liquid level within the tank 9 is to be so altered that it lies above the intra-case maximum liquid level 16a, this can be accomplished by positioning the open lower end 7b of the upstanding tubular member 7c at a height greater than the controlled liquid level 13b within the tank 9. As one of the measures to this end, the connecting or communicating conduit 15 may be constituted in a flexible structure such as a bellows 15b to thereby allow the whole liquid control apparatus to be lifted to a position where the controlled liquid level within the tank 9 lies at a level lower than the open lower end 7b of the upstanding tubular member 7c.

In this embodiment, so long as the control liquid level 13b exceeds the top 15a of the communicating conduit 15, the liquid level within the case 7 is separated from that in the tank 9 by means of the interposed conduit 15. Accordingly, bubbles or the like possibly floating on the liquid surface within the tank 9 can not be introduced to the interior of the case 7 of the liquid level control apparatus, whereby the liquid level within the tank 9 can be controlled with a high degree of accuracy.

In the case of the embodiment described above, the upstanding tubular member 7c and the tank 9 are freely communicated to the atmosphere so that both are under the same pressure. Accordingly, there is no necessity of connecting the tubular member 7c and the tank 9 with each other at respective tops thereof. However, in a case where the tank 9 is a closed structure, the controlled liquid surface within the tank can be made to coincide with the level within the case 7 by providing communication between the top of the upstanding tubular member 7c and the closed top of the tank 9.

Figure 10:
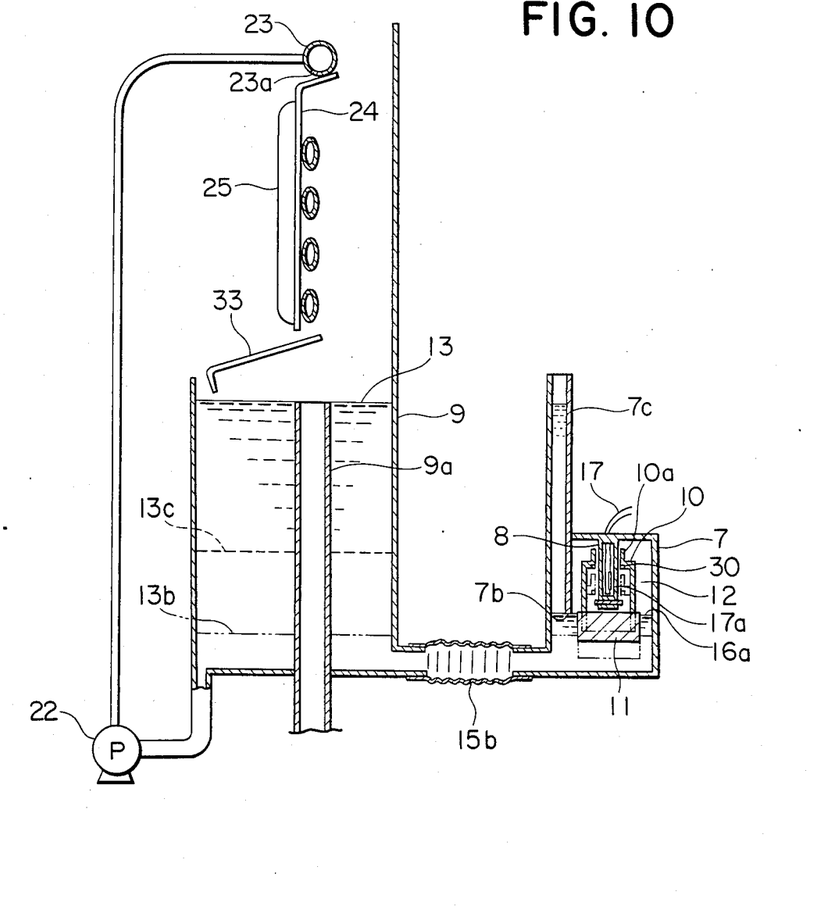
FIG. 10 is a sectional view showing a structure of an ice making machine to which the liquid level control apparatus shown in FIG. 9 is applied for controlling the liquid level in a water tank.

Further, an ice making apparatus including the liquid control apparatus according to the third embodiment and including a bellows 15b in place of the communicating conduit 15 will be described using FIG. 10. A repeated description of the components serving the same functions as those shown in FIGS. 5 and 8 is omitted.

When the water surface within the water tank 9 is at the highest liquid level 13, the maximum liquid level 16a within the case 7 is primarily determined by the position or height of the open lower end 7b of the upstanding tubular member 7c and does not rise above a height slightly above the open lower end 7b of the member 7c due to the pressure of air confined within the hermetically closed chamber 12. Consequently, the guide member 8 as well as the slidable sleeve 10a of the float suspending leg member 10 are prevented from being immersed in water even in the state where the water surface within the tank 9 has attained the maximum level 13. So long as the water surface within the tank 9 lies above the level corresponding to the open lower end of the tubular member 7c to thereby form the hermetically closed chamber 12 within the case 7, downward displacement of the float 11 as a function of the lowering of the water surface within the tank 9 is extremely small when compared with downward displacement of the water surface within the tank 9. However, when the water surface within the tank 9 is lowered below the open lower end 7b of the tubular member 7c, the water level within the tank 9 coincides with the level within the case 7 although they are geometrically separated by the bellows 15b. Accordingly, the float 11 can now directly follow the lowering of the water surface within the tank 9.

When an ice block of a smaller size is to be made by correspondingly changing the control water level 13b, this can be easily accomplished by lifting the liquid control apparatus as a whole by a distance corresponding to the difference between the controlled liquid level 13b and an updated controlled liquid level 13c by taking advantage of the flexibility of the communicating bellows 15b.

Further, the liquid level control apparatus according to a fourth embodiment of the invention will be described by referring to FIGS. 11 to 14.

Figure 11:
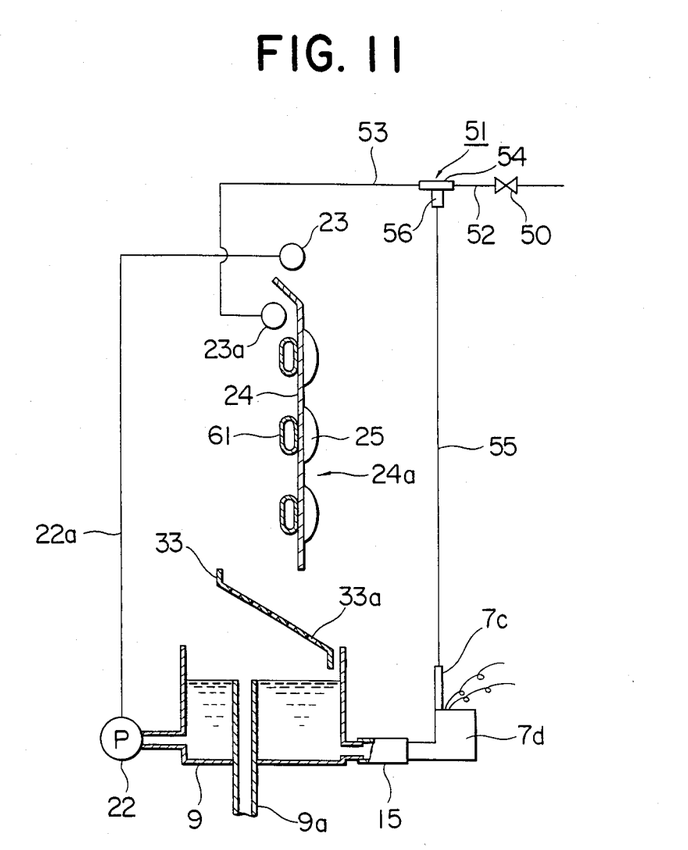
FIG. 11 is a schematic sectional view showing a structure of the liquid level control apparatus according to a fourth embodiment of the present invention.

An ice-making section 24a installed above the tank 9 includes a refrigerating plate 24 made of a suitable material exhibiting a relatively low thermal conductivity such as resin, stainless steel or the like, a sprinker 23 to sprinkle water on plate 24 and evaporators 61 mounted on the rear surface of the refrigerating plate 24 for manufacturing ice blocks 25 of an arcuate profile. The manufactured ice blocks drop on a guide plate 33 to be introduced into a storage compartment (not shown). Part of the water not frozen is introduced into the tank by passing through holes 33a formed in the ice block guide plate 33. A second water sprinkler 23a is provided to sprinkle water supplied through a water valve 50 over the rear surface of the refrigerating plate 24.

Figure 13:
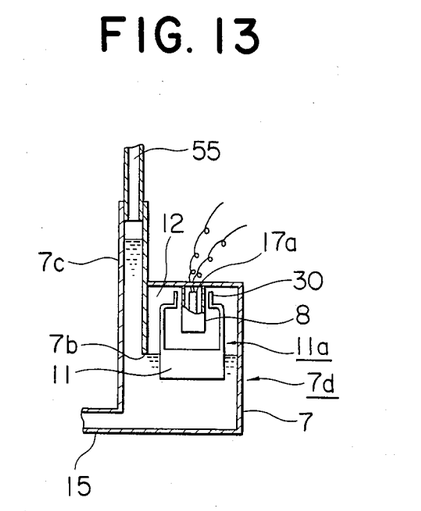
FIG. 13 is a sectional view showing a main portion of the apparatus shown in FIG. 11.

As will be seen in FIG. 13, the tank 9 is flow communicated through a connecting conduit 15 to a sub-tank 7d. The sub-tank 7d includes a case 7 which accommodates therein the liquid level control apparatus having a structure similar to the one shown in FIG. 9. In FIG. 13, equivalent or like parts as those shown in FIG. 9 are denoted by like reference symbols.

Figure 12:
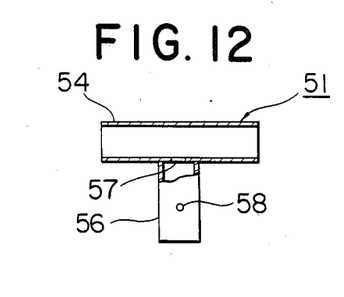
FIG. 12 is a sectional view of a main portion of the apparatus shown in FIG. 11.

The water valve 50 has an inlet connected to a water supply source such as a pipe from a water supply network and an outlet connected to an inlet of a three-way branching tube 51 which is composed of a main tube section 54 having ends connected to the water valve 50 and the second sprinkler 23a, respectively, and an auxiliary tube section 56 connected to a feed conduit 55 which in turn is connected to the upstanding tubular member 7c. Formed in the wall of the main tube 54 is a separate flow-hole 57 for introducing water supplied through the valve 50 into the feed conduit 55. A through-hole 58 formed in the auxiliary tube 56 serves to communicate the interior of the water feed conduit 55 with the ambient atmosphere so that water used for making ice is prevented from remaining within the conduit 55 when the valve 50 is closed upon completion of the ice removal cycle.

With the arrangement of the ice making system described above, a hot-gas valve 60 (FIG. 14) is opened upon completion of an ice making cycle, resulting in a hot gas flowing through the evaporators 61. Further, the water valve 50 is opened to allow water to be sprinkled over the rear surface of the refrigerating plate 24 from the second water sprinkler 23a. Thus, the ice removal cycle is initiated. At that time, water for making ice is introduced into the sub-tank 7d through the conduit 55, the ice making water being supplied to the conduit 55 through the conduit 52 and the separate flow-hole 57 upon opening of the water valve 50. In this connection, it should be mentioned that upon completion of the ice making cycle, water within the sub-tank contains a high concentration of impurities. It will be understood that water containing a high concentration of impurities is diluted by fresh water supplied through the conduit 55. In general, the inner volume of the sub-tank 7d which is provided for the purpose of detecting the liquid level within the tank containing water for making ice and in which the hermetically closed chamber 12 is formed is quite small. As a consequence, the sub-tank 7d is filled with water rapidly. Accordingly, water for ice making supplied to the sub-tank 7d will continuously push water which contains a high concentration of impurities toward the tank 9 to be further diluted, wherein a part of the water is discharged from the tank 9 through an overflow pipe 9a.

When the surface portion of the ice block 25 which contacts the refrigerating plate 24 is melted in the ice removal cycle, the ice block 25 detaches from the refrigerating plate 24 dropping on the ice guide plate 33 to be introduced into the storage compartment (not shown). In response to a signal produced by an ice-removal detector (not shown) and indicating detecting of the detachment of ice block 25 from said plate 24, said water valve 50 and the hot gas valve 60 are closed, whereupon the ice removal cycle comes to an end. At this point in time the water supply to the sub-tank 7d through the conduit 55 is interrupted since the water valve 50 is closed. As described hereinbefore, the interior of the conduit 55 is communicated with the atmosphere through the air-bleed hole 58. Accordingly, no water can remain within the conduit 55.

Figure 14:
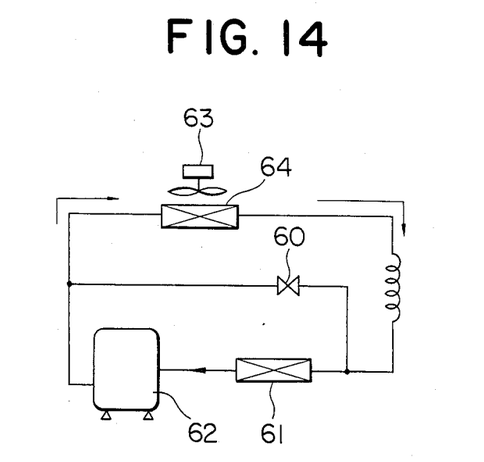
FIG. 14 is a diagram showing a refrigeration circuit.

Immediately in succession to the ice removal cycle, a compressor 62, a fan 63 for a condenser 64 and a circulating pump 22 are actuated, whereupon a new ice making cycle starts. Water is cooled down under action of the evaporators 61, whereby ice 25 is progressively formed on the refrigerating plate 24, which is accompanied by progressive lowering of the water surface within the tank 9. As soon as the water level within the upstanding tubular member 7c is lowered below the open lower end thereof, the float 11 within the sub-tank 7d starts to be lowered with the lowering of the liquid surface within the tank 9. The lowering of the float is effected smoothly without encountering obstacles such as precipitated or accumulated impurities, because the impurities are transferred to the tank 9 upon completion of the ice removal cycle, as described hereinbefore. When the water surface within the tank has attained the level at which the ice making cycle is to be terminated, a signal indicative of completion of the ice making cycle is produced by the detector including the reed switch and the magnet as described before.

The water valve 50 is opened simultaneously with the completion of the ice making cycle, resulting in that the subtank 7d is again supplied with water destined for ice making through the conduit 55, whereby the impurities stagnating in the water during the course of the ice making cycle are pushed out into the tank 9. In this way, settlement, precipitation or accumulation of impurities within the sub-tank 7d are positively prevented through the so-called periodical scavenging cycles. Thus, reliable operation of the float 11 can be assured.

In the foregoing description, it has been assumed that a float 11 is employed. It should however be understood that the invention can be equally applied to the liquid level control in which a rod-like electrode is made use of.

The liquid level control apparatus according to the first embodiment, in which the hermetically closed chamber is formed within the case (7), wherein the float disposed within the case is displaced as guided by the guiding member depending on the changes in the liquid levels within the case and the tank, can enjoy the advantageous effects mentioned below.

(1) Change in the liquid level within the case is limited to a very small value due to the pressure exerted by the hermetically closed chamber, which means that the range of displacement of the float can be reduced regardless of the difference between the maximum liquid level and the controlled liquid surface within the tank. Consequently, the float suspending leg members can be realized using a shorter length than prior art apparatuses, whereby the disadvantages of the latter described hereinbefore can be alleviated. Further, a rapid and accurate response can be realized.

(2) The guide member for the float is protected against contamination with liquid because the liquid level within the case is held low due to the pressure in the hermetically closed chamber, assuring smooth movement of the float.

(3) Since the guide member is disposed within the case (7), it is protected from being contaminated by liquid spattered from the controlled liquid surface.

The liquid level control apparatus according to the second embodiment of the invention, which comprises a tank containing a liquid, a hollow case provided externally of the tank and flow connected thereto, a float disposed within the case movable vertically in response to changes in the liquid level within the tank, and a guide member disposed within the case for guiding the vertical movement of the float, wherein the case is so arranged that upon rising of the liquid surface within the case, a hermetically closed chamber is formed within the case in cooperation with the liquid surface, brings about the following advantages:

(1) The control of the liquid level within the tank can be easily realized by simply flow connecting the liquid level control apparatus to the tank at the desired height of the controlled liquid surface, independently from the overall height and inner diameter of the tank and independent of the difference between the maximum liquid level and the controlled liquid level. Thus, it is unnecessary to construct the liquid level control apparatus in conformance with the size of the tank.

(2) Because the liquid control apparatus is disposed externally of the tank, spattering of the guide member and the reed switch can be prevented when liquid is poured into the tank, assuring reliable operation of the float and the level detection switch.

(3) Since the lead wires for transmitting a signal informing detection of the controlled liquid level are located externally of the tank and never brought into contact with vapors of the liquid, the level control apparatus can be safely used for the level control or detection of combustible liquids.

The liquid level control apparatus according to the third embodiment, which is so arranged that the liquid level within the tank at which the hermetically closed chamber is formed is determined by the open lower end of an upstanding tubular member within which the liquid level is the same as that of the tank, brings about the following advantages:

(1) Coincidence of the liquid level within the case (7) with that of the tank can be easily realized by adjusting the vertical position of the open lower end of the upstanding tubular member. Accordingly, the control of the liquid level within the tank can be effected in the region where displacement of the float instantaneously follows the change in the liquid level within the tank. Further, determination of the controlled liquid level within the tank undergoes no constriction occuring from the position, size or other factors of the connecting conduit flow connecting the tank and the case to each other.

(2) Since the controlled liquid surface within the tank is separated from the liquid level prevailing within the case at that time, bubbles on the liquid surface within the tank are positively prevented from entering the case, whereby erroneous detection of the liquid level within the tank can be avoided.

Further, the liquid level control apparatus according to the fourth embodiment of the invention is advantageous in that water stagnating within the sub-tank in the ice making cycle is discharged outwardly from the tank upon initiation of the ice removal cycle, thus preventing precipitation and accumulation of impurities contained in the water, whereby accurate operation of the liquid level control apparatus can be assured.

In the foregoing description, it has been assumed that the liquid level control apparatus according to the invention is applied to ice making equipment. It should however be appreciated that the disclosed teachings of the invention can be equally applied to the level control of water or liquid chemicals in other sorts of apparatuses.

What is claimed is:

1. A liquid level control apparatus, comprising:
a tank for holding liquid;
a hollow case in fluid communication with said tank, said hollow case having an opening at a lower end thereof, and a chamber for trapping air, said chamber being in fluid communication with said opening;

a float disposed in said hollow case and guided for vertical movement in response to changing liquid levels in said tank;

guide means disposed in said chamber for guiding said float in said vertical direction;

connection means between said tank and said hollow case for flow of liquid therebetween;

an upstanding tubular member having a lower end in fluid communication with said chamber, said lower end being at a position higher than the uppermost point of said connection means, thus defining a level of liquid within said hollow case at which said chamber is hermetically sealed and thereby preventing said guide means from being immersed in said liquid, irrespective of the level of said liquid in said tank or in said hollow case;

a liquid supply valve; and a conduit connected between said upstanding tubular member and said liquid supply valve to supply liquid to said hollow case and cause liquid to flow from said hollow case towards said tank to thereby prevent accumulation of impurities in said hollow case.

2. The liquid level control apparatus of claim 1, wherein said upstanding tubular member is connected to a source of air at atmospheric pressure at an upper end thereof.

3. The liquid level control apparatus of claim 1, wherein said tubular member does not interfere with the vertical movement of said float.

4. The liquid level control apparatus of claim 1, further comprising a reed switch mounted on said guide means and a sleeve connected to said float and slidable on said guide means, said sleeve supporting a magnet for actuating said reed switch by vertical movement of said float in response to changing levels of liquid in said hollow case.

5. The liquid level control apparatus of claim 1, wherein said connection means comprises a flexible bellows-like conduit.

6. The liquid level control apparatus of claim 1, wherein said supply valve is a water supply valve and ice making means is connected to said tank for forming ice cubes from the liquid contained in said tank.

* * * * *